United States Patent [19]
Durand

[11] Patent Number: 6,099,194
[45] Date of Patent: Aug. 8, 2000

[54] SPLICE JOINT FOR CONNECTING ADJACENT SIDE RAIL SECTIONS IN A VEHICLE BODY AND FRAME ASSEMBLY

[75] Inventor: Robert D. Durand, Wyomissing, Pa.

[73] Assignee: Dana Corporation, Toledo, Ohio

[21] Appl. No.: 08/915,418

[22] Filed: Aug. 20, 1997

[51] Int. Cl.[7] ............................................ F16B 5/08
[52] U.S. Cl. .................... 403/270; 403/363; 296/29; 296/204
[58] Field of Search .................... 403/270, 271, 403/272, 363, 265, 404; 296/29, 30, 204, 203.02, 194; 280/800, 781, 790

[56] References Cited

U.S. PATENT DOCUMENTS

| | | |
|---|---|---|
| 1,698,179 | 1/1929 | Walker . |
| 2,297,123 | 9/1942 | Almdale . |
| 2,801,864 | 8/1957 | Raney et al. . |
| 3,614,124 | 10/1971 | Schwabenlender . |
| 5,149,132 | 9/1992 | Ruehl et al. . |
| 5,308,115 | 5/1994 | Ruehl et al. . |
| 5,320,403 | 6/1994 | Kazyak ................................ 296/29 X |
| 5,332,281 | 7/1994 | Janotik et al. ........................... 296/209 |
| 5,609,386 | 3/1997 | Takahashi et al. ..................... 296/30 X |
| 5,634,663 | 6/1997 | Krupp et al. ........................... 296/29 X |
| 5,645,364 | 7/1997 | Hodozuka et al. ..................... 403/270 |
| 5,829,219 | 11/1998 | Sugawara et al. ..................... 296/29 X |

FOREIGN PATENT DOCUMENTS

| | | | |
|---|---|---|---|
| 589640 | 12/1959 | Canada ................................... 403/271 |
| 720798 | 4/1942 | Germany . |
| 1131524 | 12/1959 | Germany .............................. 280/790 |
| 6270839 | 9/1994 | Japan ..................................... 280/790 |

*Primary Examiner*—Harry C. Kim
*Attorney, Agent, or Firm*—MacMillan, Sobanski & Todd, LLC

[57] ABSTRACT

A splice joint for connecting a pair of open channel side rail sections in a vehicular body and frame assembly focuses stresses imposed thereon away from the longitudinal edges of the structural members. In a first aspect of this invention, one or both end portions of the side rail sections are formed having an offset. The end portions of the side rail sections overlap one another and are secured together in any conventional manner, such as by welding. Preferably, the welds are made in such a manner that they terminate prior to reaching any of the longitudinally extending edges of the side rail sections. In a second aspect of this invention, the portions of the side rail sections are butt welded together. A support bracket is secured to the side rail sections in any conventional manner, such as by welding. Again, the welds are preferably made in such a manner as to terminate prior to reaching any of the longitudinally extending edges of the side rail sections.

12 Claims, 5 Drawing Sheets

SPLICE JOINT FOR CONNECTING ADJACENT SIDE RAIL SECTIONS IN A VEHICLE BODY AND FRAME ASSEMBLY

BACKGROUND OF THE INVENTION

This invention relates in general to body and frame assemblies for vehicles. More specifically, this invention relates to an improved structure for a splice joint for connecting a pair of open channel side rail sections in a vehicular body and frame assembly that focuses stresses imposed thereon away from the longitudinal edges of the structural members.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural sections that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural sections that are secured together, such as by welding, to provide a unitary structural member that extends the entire length of the vehicle body and frame assembly.

Traditionally, the side rails of known vehicle body and frame assemblies have been formed from open channel structural members, i.e., structural members that have a non-continuous cross sectional shape (U-shaped or C-shaped channel members, for example). Thus, it is known to use a single integral open channel structural member to form a side rail that extends the entire length of the vehicle body and frame assembly, as described above. Additionally, it is known to secure a plurality of such open channel structural members together to form the individual sections of a unitary side rail for a vehicle body and frame assembly, as also described above. It will be appreciated that each of such open channel structural members has a pair of longitudinally extending edges. It is known that these longitudinal edges are somewhat weaker than the interior portions of the structural members. Thus, when excessive stresses are imposed upon a side rail during use, cracks usually initiate at the longitudinally extending edges of the structural members and migrate inwardly toward the interior regions thereof.

A number of joint structures are known for permanently joining two open channel structural members to provide a unitary side rail in a ladder frame assembly. One known joint structure is commonly referred to as a butt joint. In a typical butt joint, a rearward end of a first side rail section is disposed directly adjacent to a forward end of a second side rail section, with no overlapping of the two side rail sections. The two adjacent ends of the side rail sections are then permanently secured together, such as by welding, to provide a unitary side rail. Another known joint structure is commonly referred to as a splice or overlap joint. In a typical splice joint, a rearward end of a first side rail section partially overlaps a forward end of a second side rail section. The two overlapped ends of the side rail sections are then permanently secured together, such as by welding, to provide a unitary side rail.

Although known butt and splice joint structures have been effective, it has been found that the such joint structures tend to focus stresses imposed upon the side rail at or near the longitudinal edges of the open channel structural members. Thus, it has been necessary to design known joint structures to accommodate the maximum loads at the longitudinal edges of the structural members. As a result, the other portions of the structural members are, in essence, overdesigned for the loads intended to be carried thereon. This can result in the use of thicker or heavier materials to form the structural members, adding undesirable additional weight to the vehicle body and frame assembly. Thus, it would be desirable to provide an improved structure for a splice joint for connecting a pair of open channel side rail sections in a vehicular body and frame assembly that focuses stresses imposed thereon away from the longitudinal edges of the structural members.

SUMMARY OF THE INVENTION

This invention relates to an improved structure for a splice joint for connecting a pair of open channel side rail sections in a vehicular body and frame assembly that focuses stresses imposed thereon away from the longitudinal edges of the structural members. In a first aspect of this invention, one or both end portions of the side rail sections are formed having an offset. The end portions of the side rail sections overlap one another and are secured together by any conventional means, such as by welding. Preferably, the welds are made in such a manner that they terminate prior to reaching any of the longitudinally extending edges of the side rail sections. In a second aspect of this invention, the portions of the side rail sections are butt welded together. A support bracket is secured to the side rail sections by any conventional means, such as by welding. Again, the welds are preferably made in such a manner as to terminate prior to reaching any of the longitudinally extending edges of the side rail sections.

Various objects and advantages of this invention will become apparent to those skilled in the art from the follow-

DETAILED DESCRIPTION OF THE PREFERRED EMBODIMENTS

Figure 1:
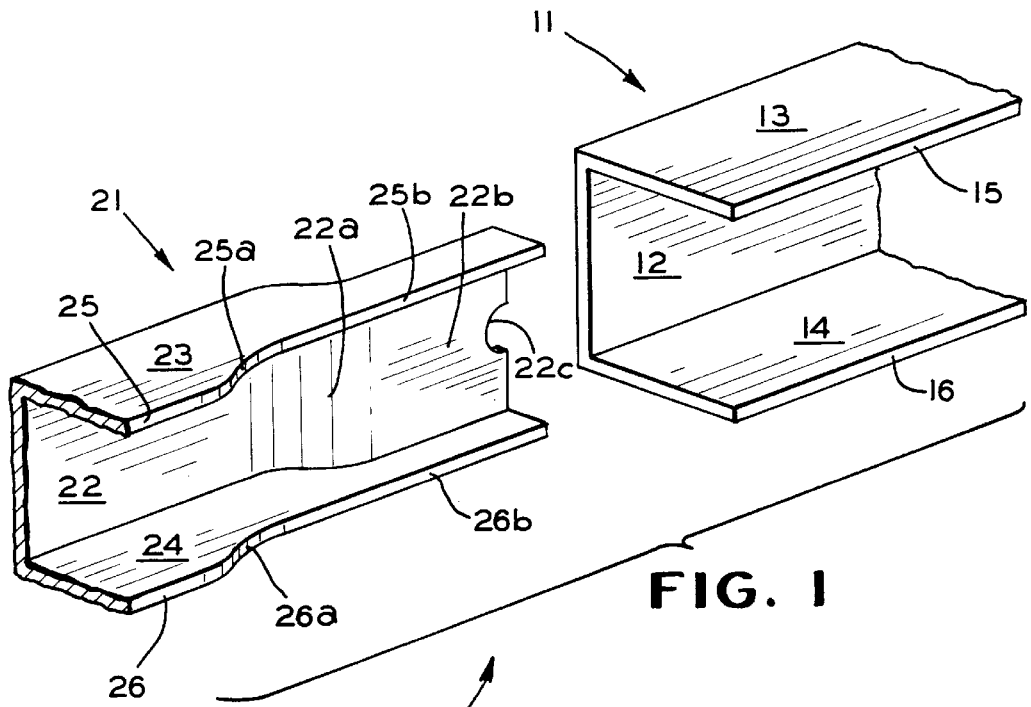
FIG. 1 is an exploded perspective view of a first embodiment of a splice joint for permanently a pair of open channel side rail sections to provide a unitary side rail for a vehicular body and frame assembly in accordance with this invention.

Referring now to the drawings, there is illustrated in FIGS. 1 through 4 a first embodiment of a splice joint, indicated generally at 10, in accordance with this invention for permanently joining the end portions of a pair of open channel side rail sections, indicated generally at 11 and 21, to provide a unitary side rail, such as for a vehicular body and frame assembly. As will be discussed in detail below, the first and second side rail sections 11 and 21 have respective end portions that are connected together to form the splice joint 10. Throughout this discussion, relative terms, such as horizontal, vertical, upper, lower, front, and rear, will be used for the sake of facilitating the explanation of this invention and are not intended to limit the scope thereof.

The first side rail section 11 is a generally straight, elongated member having a generally C-shaped cross section defined by a vertical web 12, an upper horizontal flange 13 extending from an upper longitudinal edge of the web 12, and a lower horizontal flange 14 extending from a lower longitudinal edge of the web 12. The upper and lower flanges 13 and 14 are preferably formed integrally with the web 12 as shown, although such is not required. The upper and lower flanges 13 and 14 of the first side rail section 11 have respective longitudinally extending edges 15 and 16. Although shown as having a C-shaped cross section, it will be appreciated that the first side rail section 11 may be formed having any desired open channel cross sectional shape.

The second side rail section 21 is also a generally straight, elongated member having a generally C-shaped cross section defined by a vertical web 22, an upper horizontal flange 23 extending from an upper longitudinal edge of the web 22, and a lower horizontal flange 24 extending from a lower longitudinal edge of the web 22. The upper and lower flanges 23 and 24 are preferably formed integrally with the web 22 as shown, although such is not required. The upper and lower flanges 23 and 24 of the second side rail section 21 have respective longitudinally extending edges 25 and 26. Although shown as having a C-shaped cross section, it will be appreciated that the second side rail section 21 may be formed having any desired open channel cross sectional shape.

The end portion of the second side rail section 21 has a first offset portion provided in the web 22 thereof. The first offset portion is characterized by a curved portion 22a and a straight portion 22b extending parallel to, but offset from, the main portion of the web 22 of the second side rail section 20. The purpose for the first offset portion of the second side rail section 21 will be explained below. The end portion of the second rail section 21 further has a second offset portion provided in the upper and lower flanges 23 and 24 thereof. The second offset portion is characterized by curved portions 25a and 26a and straight portions 25b and 26b extending respectively parallel to, but offset from, the main portions of the longitudinal edges 25 and 26 of the upper and lower flanges 23 and 24. The purpose for the second offset portion of the second side rail section 21 will also be explained below. The web portion 22 terminates in a vertically extending edge having a cut-out 22c formed therein. The illustrated cut-out 22c is semi-circular in shape, although it may be formed having any other desired shape. The purpose for the cut-out 22c will also be explained below.

Figure 2:
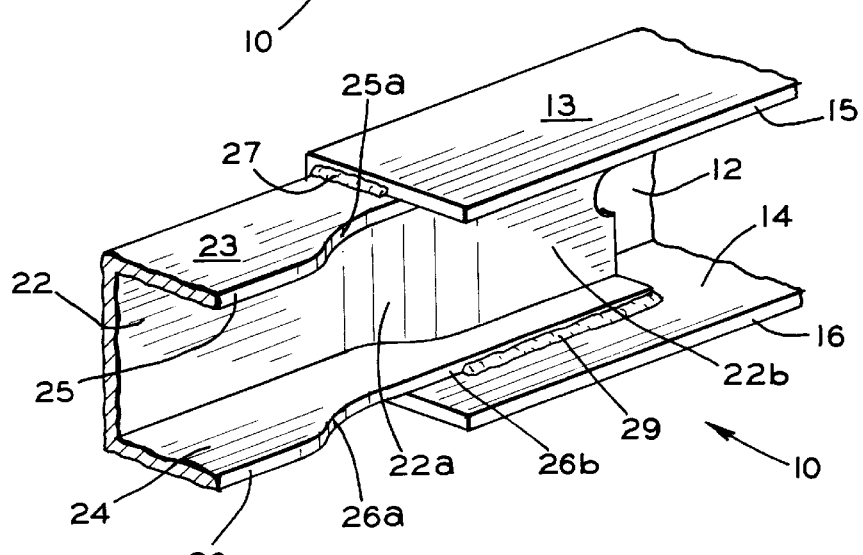
FIG. 2 is a perspective view of the first embodiment of the splice joint illustrated in FIG. 1 shown assembled.
Figure 3:
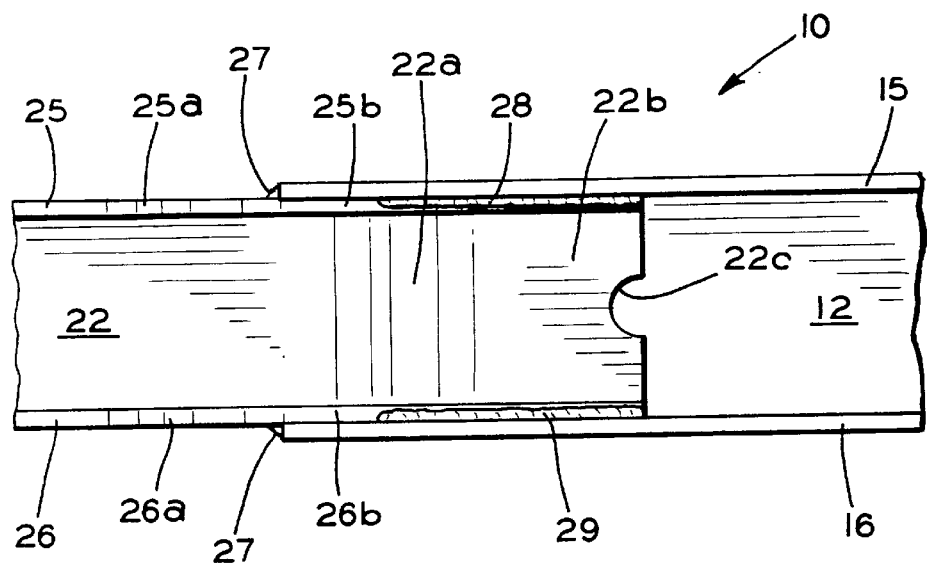
FIG. 3 is a side elevational view of the first embodiment of the splice joint illustrated in FIG. 2.
Figure 4:
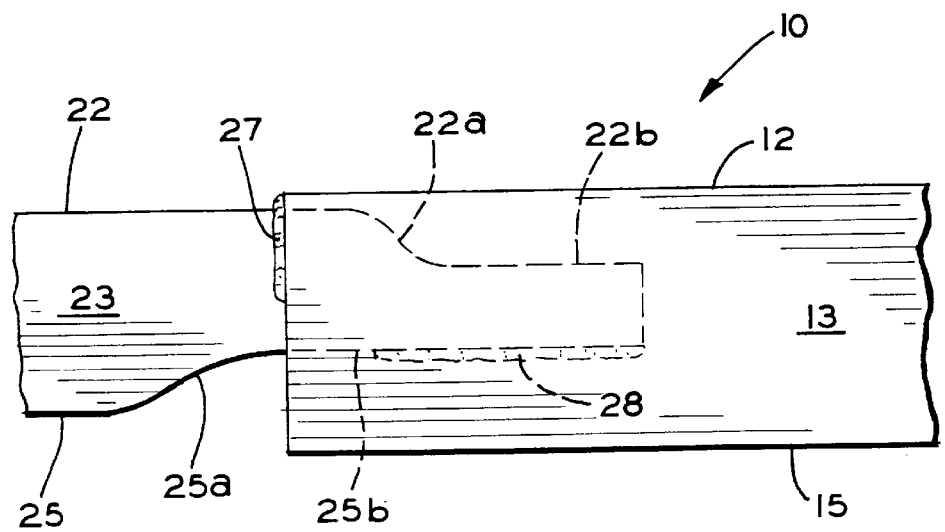
FIG. 4 is a top plan view of the first embodiment of the splice joint illustrated in FIG. 2.

In the illustrated embodiment, the web 22 has a constant height throughout the end portion of the second side rail section 21, although such is not necessary. That height is slightly smaller than the height of the first side rail section 11 such that the second side rail section 21 may be nested within the first side rail section 11 as shown in FIGS. 2, 3, and 4. In this nested position, the web 22 and the upper and lower flanges 23 and 24 of the second side rail section 21 are disposed respectively adjacent to the web 12 and the upper and lower flanges 13 and 14 of the first side rail section 11. It will be appreciated, however, that the first and second side rail sections 11 and 21 may be sized in such a manner that the first side rail section 11 is nested within the second side rail section 21 if desired.

To assemble the splice joint 10, the first and second side rail sections 11 and 21 are disposed in the nested orientation illustrated in FIGS. 2, 3, and 4. Then, portions of the first and second side rail sections 11 and 21 are secured together by any conventional means, such as by welding. As best shown in FIGS. 2 and 4, a first weld 27 is provided between a portion of the leading edge of the upper flange 13 of the first side rail section 11 and a portion of the upper surface of the upper flange 23 of the second side rail section 21. This first weld 27 continues between the leading edge of the web 12 of the first side rail section 11 and the outer surface of the web 22 of the second side rail section 21, and further continues between a portion of the leading edge of the lower flange 14 of the first side rail section 11 and a portion of the lower surface of the lower flange 24 of the second side rail section 21. The first weld 27 may be continuous throughout this extent as illustrated, or may be formed in discrete areas. However, it will be noted that on the upper flanges 13 and 23, the first weld 27 terminates prior to reaching either the longitudinally extending edge 15 of the first side rail upper flange 13 or the longitudinally extending edge 25 of the second side rail upper flange 23. Similarly, the first weld 27 terminates prior to reaching either the longitudinally extending edge 16 of the first side rail lower flange 14 or the longitudinally extending edge 26 of the second side rail lower flange 24.

As best shown in FIGS. 3 and 4, a second weld 28 is provided between the straight portion 25b of the longitudinally extending edge 25 of the upper flange 23 of the second side rail section 21 and the lower surface of the upper flange 13 of the first side rail section 21. Similarly, a third weld 29 is provided between the straight portion 26b of the longitudinally extending edge 26 of the lower flange 24 of the second side rail section 21 and the upper surface of the lower flange 14 of the first side rail section 11. The second and third welds 28 and 29 may be continuous as illustrated, or may be formed in discrete areas. However, it will be noted that on the upper flanges 13 and 23, the second weld 28 terminates prior to reaching the leading edge of the upper flange 13 of the first side rail section 11. Similarly, on the lower flanges 14 and 24, the third weld 29 terminates prior to reaching the leading edge of the lower flange 14 of the first side rail section 11.

The single offset structure illustrated in FIGS. 1 through 4 provides a rated transition in stiffness between the first and second side rail sections 11 and 21 such that there is no significant loss in strength throughout the extent of the splice joint 10. More importantly, the single offset structure creates no significant stress risers at or near any of the edges of the first and second side rail sections 11 and 12. The termination of the welds 27, 28, and 29 prior to reaching such edges focuses the stresses imposed upon the splice joint 10 away from the longitudinally extending edges 15, 16, 25, and 26 (as well as the leading and trailing edges thereof) and toward the interior regions of the first and second side rail members 11 and 21. Thus, the splice joint 10 tends to prevent cracks or other failures from occurring at the various edges of the first and second side rail members 11 and 21.

As mentioned above, the web portion 22 of the second side rail member 21 terminates in a vertically extending edge having a cut-out 22c formed therein. The cut-out is provided to accommodate a certain amount of flexing in the splice joint 10. With reference to FIG. 3, it can be seen that when a vertical load is placed upon the overlapping portions of the first and second side rail members 11 and 21, the central portion of the splice joint 10 will flex upwardly or downwardly in a horizontally extending plane. The cut-out 22c accommodates a certain amount of this flexing movement by allowing the upper and lower terminal portions of the web 22 (i.e., those portions of the web 22 immediately above and below the cut-out 22c) to flex relative to one another. In this manner, the creation of another undesirable stress riser is minimized.

Figure 5:
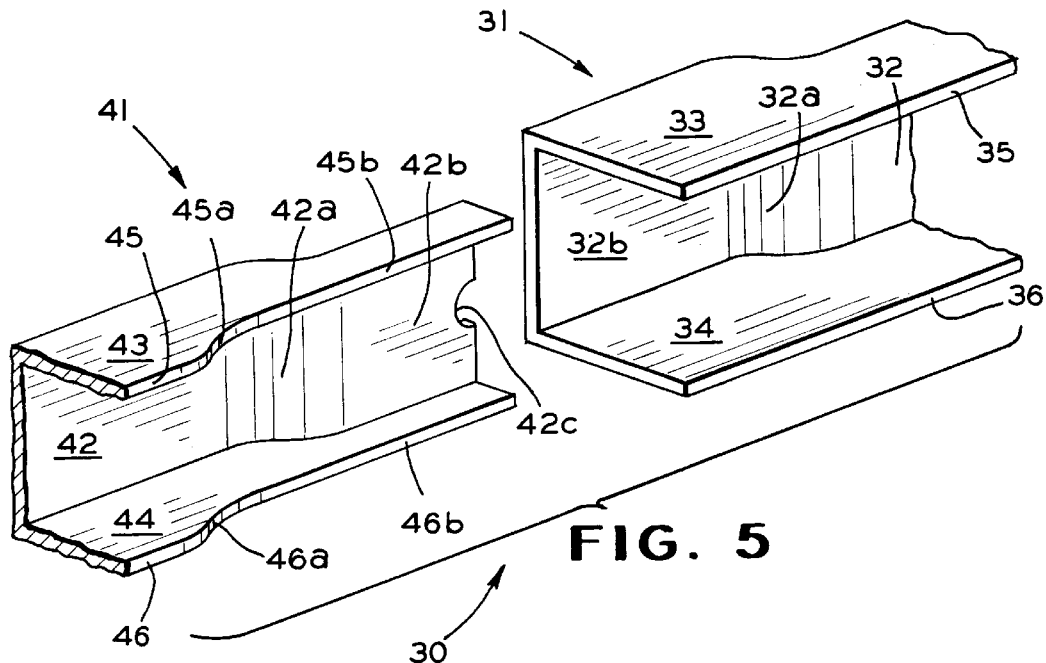
FIG. 5 is an exploded perspective view of a second embodiment of a splice joint for permanently a pair of open channel side rail sections to provide a unitary side rail for a vehicular body and frame assembly in accordance with this invention.
Figure 6:
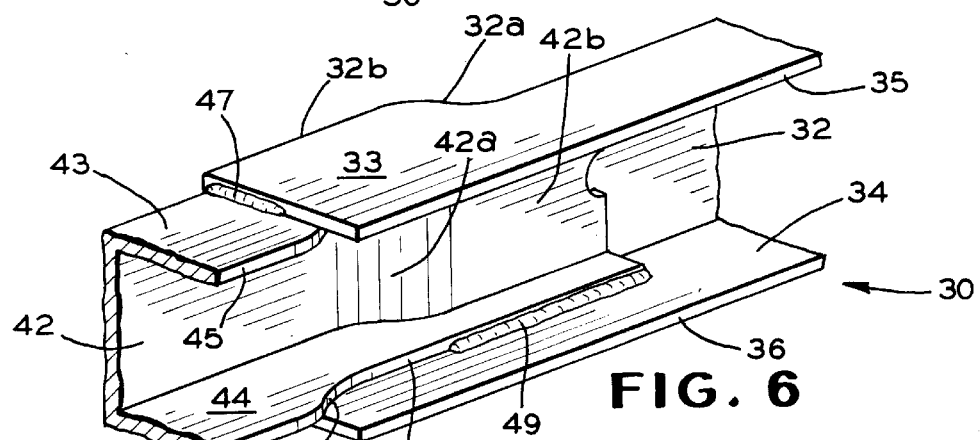
FIG. 6 is a perspective view of the second embodiment of the splice joint illustrated in FIG. 5 shown assembled.
Figure 7:
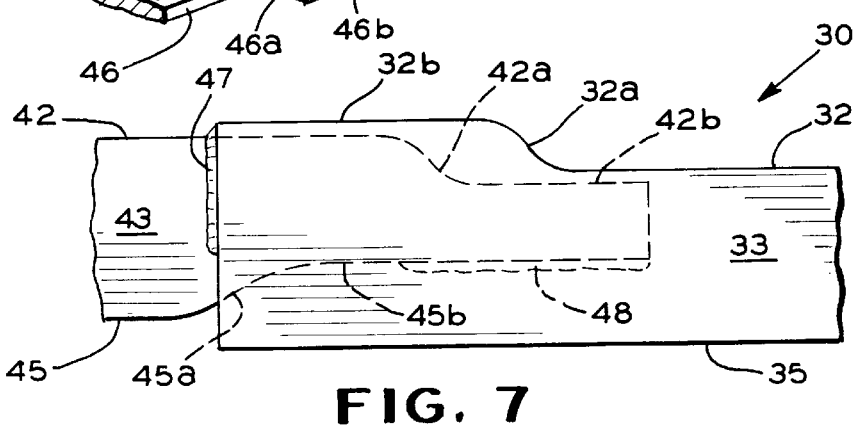
FIG. 7 is a top plan view of the second embodiment of the splice joint illustrated in FIG. 6.

Referring now to FIGS. 5 through 7, there is illustrated a second embodiment of a splice joint, indicated generally at 30, in accordance with this invention for permanently joining the end portions of a pair of open channel side rail sections, indicated generally at 31 and 41, to provide a unitary side rail, such as for a vehicular body and frame assembly. The first side rail section 31 is a generally straight, elongated member having a generally C-shaped cross section defined by a vertical web 32, an upper horizontal flange 33 extending from an upper longitudinal edge of the web 32, and a lower horizontal flange 34 extending from a lower longitudinal edge of the web 32. The upper and lower flanges 33 and 34 are preferably formed integrally with the web 32 as shown, although such is not required. The upper and lower flanges 33 and 34 of the first side rail section 31 have respective longitudinally extending edges 35 and 36. Although shown as having a C-shaped cross section, it will be appreciated that the first side rail section 31 may be formed having any desired open channel cross sectional shape. The end portion of the first side rail section 31 has an offset portion provided in the web 32 thereof. The first offset portion is characterized by a curved portion 32a and a straight portion 32b extending parallel to, but offset from, the main portion of the web 32 of the first side rail section 30. The purpose for the offset portion of the first side rail section 31 will be explained below.

The second side rail section 41 is also a generally straight, elongated member having a generally C-shaped cross section defined by a vertical web 42, an upper horizontal flange 43 extending from an upper longitudinal edge of the web 42, and a lower horizontal flange 44 extending from a lower longitudinal edge of the web 42. The upper and lower flanges 43 and 44 are preferably formed integrally with the web 42 as shown, although such is not required. The upper and lower flanges 43 and 44 of the second side rail section 41 have respective longitudinally extending edges 45 and 46. Although shown as having a C-shaped cross section, it will be appreciated that the second side rail section 41 may be formed having any desired open channel cross sectional shape.

The end portion of the second side rail section 41 has a first offset portion provided in the web 42 thereof. The first offset portion is characterized by a curved portion 42a and a straight portion 42b extending parallel to, but offset from, the main portion of the web 42 of the second side rail section 40. The purpose for the first offset portion of the second side rail section 41 will be explained below. The end portion of the second rail section 41 further has a second offset portion provided in the upper and lower flanges 43 and 44 thereof. The second offset portion is characterized by curved portions 45a and 46a and straight portions 45b and 46b extending respectively parallel to, but offset from, the main portions of the longitudinal edges 45 and 46 of the upper and lower flanges 43 and 44. The purpose for the second offset portion of the second side rail section 41 will also be explained below. The web portion 42 terminates in a vertically extending edge having a cut-out 42c formed therein. The illustrated cut-out 42c is semi-circular in shape, although it may be formed having any other desired shape. The purpose for the cut-out 42c will also be explained below.

In the illustrated embodiment, the web 42 has a constant height throughout the end portion of the second side rail section 41, although such is not necessary. That height is slightly smaller than the height of the first side rail section 31 such that the second side rail section 41 may be nested within the first side rail section 31 as shown in FIGS. 6 and 7. In this nested position, the web 42 and the upper and lower flanges 43 and 44 of the second side rail section 41 are disposed respectively adjacent to the web 32 and the upper and lower flanges 33 and 34 of the first side rail section 31. It will be appreciated, however, that the first and second side rail sections 31 and 41 may be sized in such a manner that the first side rail section 31 is nested within the second side rail section 41 if desired.

To assemble the splice joint 30, the first and second side rail sections 31 and 41 are disposed in the nested orientation illustrated in FIGS. 6 and 7. Then, portions of the first and second side rail sections 31 and 41 are secured together by any conventional means, such as by welding. As best shown in FIGS. 6 and 7, a first weld 47 is provided between a portion of the leading edge of the upper flange 33 of the first side rail section 31 and a portion of the upper surface of the upper flange 43 of the second side rail section 41. This first weld 47 continues between the leading edge of the web 32 of the first side rail section 31 and the outer surface of the web 42 of the second side rail section 41, and further continues between a portion of the leading edge of the lower flange 34 of the first side rail section 31 and a portion of the lower surface of the lower flange 44 of the second side rail section 41. The first weld 47 may be continuous throughout this extent as illustrated, or may be formed in discrete areas. However, it will be noted that on the upper flanges 33 and 43, the first weld 47 terminates prior to reaching either the longitudinally extending edge 35 of the first side rail upper flange 33 or the longitudinally extending edge 45 of the second side rail upper flange 43. Similarly, the first weld 47 terminates prior to reaching either the longitudinally extending edge 36 of the first side rail lower flange 34 or the longitudinally extending edge 46 of the second side rail lower flange 46.

As shown in FIG. 7, a second weld 48 is provided between the straight portion 45b of the longitudinally extending edge 45 of the upper flange 43 of the second side rail section 41 and the lower surface of the upper flange 33 of the first side rail section 31. Similarly, as shown in FIG. 6, a third weld 49 is provided between the straight portion 46b of the longitudinally extending edge 46 of the lower flange 44 of the second side rail section 41 and the upper surface of the lower flange 34 of the first side rail section 31. The second and third welds 48 and 49 may be continuous as illustrated, or may be formed in discrete areas. However, it will be noted that on the upper flanges 33 and 43, the second weld 48 terminates prior to reaching the leading edge of the upper flange 33 of the first side rail section 31. Similarly, on the lower flanges 34 and 44, the third weld 49 terminates prior to reaching the leading edge of the lower flange 34 of the first side rail section 31. The double offset structure illustrated in FIGS. 5 through 7 provides the same advantages as described above, but further provides an additional measure of stiffness to the splice joint 30.

Figure 8:
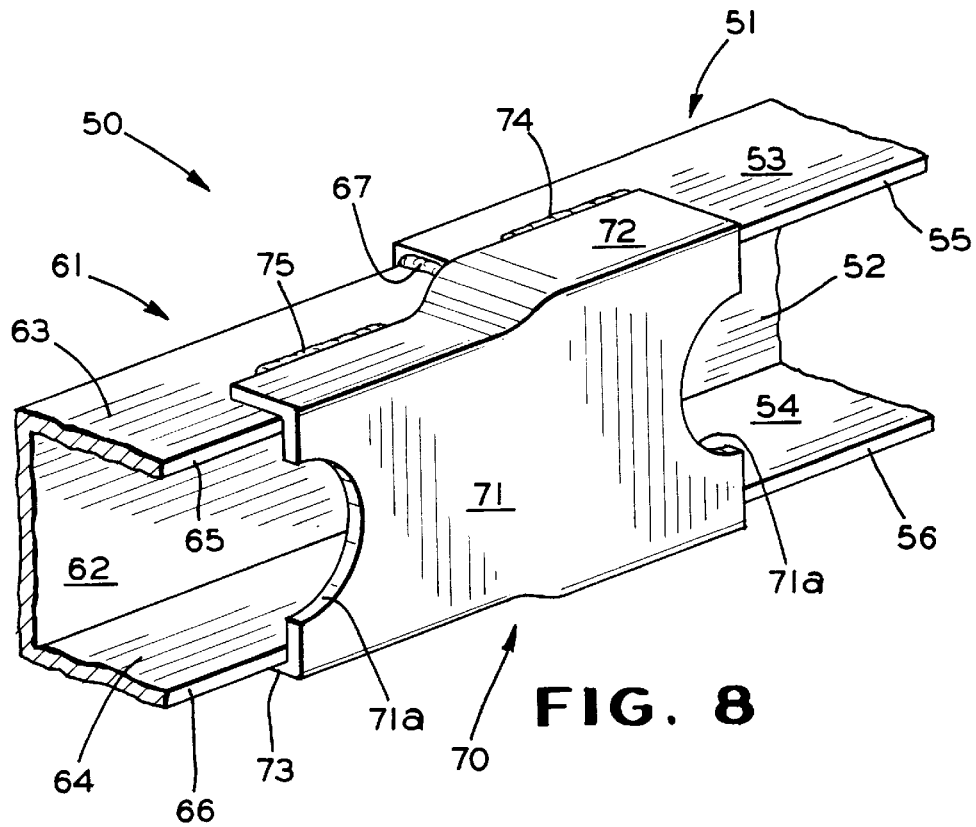
FIG. 8 is a perspective view of a third embodiment of a splice joint for permanently a pair of open channel side rail sections to provide a unitary side rail for a vehicular body and frame assembly in accordance with this invention.

Referring now to FIG. 8, there is illustrated a third embodiment of a splice joint, indicated generally at 50, in accordance with this invention for permanently joining the end portions of a pair of open channel side rail sections, indicated generally at 51 and 61, to provide a unitary side rail, such as for a vehicular body and frame assembly. The first side rail section 51 is a generally straight, elongated member having a generally C-shaped cross section defined by a vertical web 52, an upper horizontal flange 53 extending from an upper longitudinal edge of the web 52, and a lower horizontal flange 54 extending from a lower longitudinal edge of the web 52. The upper and lower flanges 53 and 54 are preferably formed integrally with the web 52 as shown, although such is not required. The upper and lower flanges 53 and 54 of the first side rail section 51 have respective longitudinally extending edges 55 and 56. Although shown as having a C-shaped cross section, it will be appreciated that the first side rail section 51 may be formed having any desired open channel cross sectional shape.

Similarly, the second side rail section 61 is a generally straight, elongated member having a generally C-shaped cross section defined by a vertical web 62, an upper horizontal flange 63 extending from an upper longitudinal edge of the web 62, and a lower horizontal flange 64 extending from a lower longitudinal edge of the web 62. The upper and lower flanges 63 and 64 are preferably formed integrally with the web 62 as shown, although such is not required. The upper and lower flanges 63 and 64 of the second side rail section 61 have respective longitudinally extending edges 65 and 66. Although shown as having a C-shaped cross section, it will be appreciated that the second side rail section 61 may be formed having any desired open channel cross sectional shape.

In the illustrated embodiment, the web 62 has a constant height throughout the end portion of the second side rail section 61, although such is not necessary. That height is slightly smaller than the height of the first side rail section 51 such that the second side rail section 61 may be nested within the first side rail section 51 as shown in FIG. 8. In this nested position, the web 62 and the upper and lower flanges 63 and 64 of the second side rail section 61 are disposed respectively adjacent to the web 52 and the upper and lower flanges 53 and 54 of the first side rail section 51. It will be appreciated, however, that the first and second side rail sections 51 and 61 may be sized in such a manner that the first side rail section 51 is nested within the second side rail section 61 if desired.

To assemble the splice joint 50, the first and second side rail sections 51 and 61 are disposed in the nested orientation illustrated in FIG. 8. Then, portions of the first and second side rail sections 51 and 61 are secured together by any conventional means, such as by welding. A first weld 67 is provided between the leading edge of the upper flange 53 of the first side rail section 51 and the upper surface of the upper flange 63 of the second side rail section 61. This first weld 67 continues between the leading edge of the web 52 of the first side rail section 51 and the outer surface of the web 62 of the second side rail section 61, and further continues between the leading edge of the lower flange 54 of the first side rail section 51 and the lower surface of the lower flange 64 of the second side rail section 61. The first weld 67 may be continuous throughout this extent as illustrated, or may be formed in discrete areas. In this embodiment, the first weld 67 may, if desired, extend completely to either the longitudinally extending edges 55 and 65 of the upper flanges 53 and 63 or the longitudinally extending edges 56 and 66 of the lower flanges 54 and 64.

To prevent or minimize the stress risers that would otherwise be present at the longitudinally extending edges 55, 56, 65, and 66, the splice joint 50 includes a support bracket, indicated generally at 70. The support bracket 70 is a generally straight, elongated member having a generally C-shaped cross section defined by a vertical web 71, an upper horizontal flange 72 extending from an upper longitudinal edge of the web 71, and a lower horizontal flange 73 extending from a lower longitudinal edge of the web 71. The upper and lower flanges 72 and 73 are preferably formed integrally with the web 71 as shown, although such is not required. The ends of the web portion 71 of the support bracket 70 terminate in vertically extending edges, each of which has a cut-out 71a formed therein.

The upper flange 72 of the support bracket 70 extends adjacent to the upper flanges 53 and 63 of the first and second side rail members 51 and 61, respectively. A second weld 74 is provided between portions of the upper flange 72 of the support bracket 70 and portions of the upper surface of the upper flange 53 of the first side rail section 51. A third weld 75 is provided between portions of the upper flange 72 of the support bracket 70 and portions of the upper surface of the upper flange 63 of the second side rail section 61. Similarly, a fourth weld (not shown) is provided between portions of the lower flange 73 of the support bracket 70 and portions of the lower surface of the lower flange 54 of the first side rail section 51, and a fifth weld (not shown) is provided between portions of the lower flange 73 of the support bracket 70 and portions of the lower surface of the lower flange 64 of the second side rail section 61. Each of these welds may be continuous as illustrated, or may be formed in discrete areas. However, it will be noted that on the upper flanges 53, the second weld 74 terminates prior to reaching the leading edge of the upper flange 53. Similarly, the third weld 75 terminates prior to reaching the leading edge of the upper flange 53. The support bracket 70 provides the same advantages as described above by preventing or minimizing the stress risers that would otherwise be present at the longitudinally extending edges 55, 56, 65, and 66 of the splice joint 50.

Figure 9:
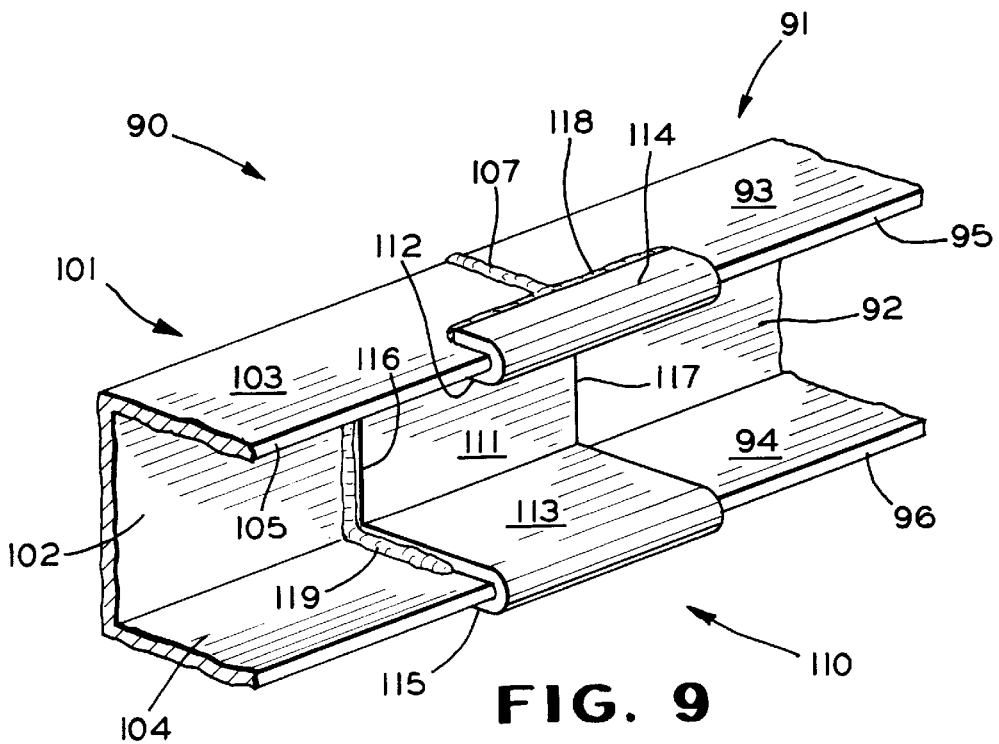
FIG. 9 is a perspective view of a fourth embodiment of a splice joint for permanently a pair of open channel side rail sections to provide a unitary side rail for a vehicular body, and frame assembly in accordance with this invention.

Referring now to FIG. 9, there is illustrated a fourth embodiment of a splice joint, indicated generally at 90, in accordance with this invention for permanently joining the end portions of a pair of open channel side rail sections, indicated generally at 91 and 101, to provide a unitary side rail, such as for a vehicular body and frame assembly. The first side rail section 91 is a generally straight, elongated member having a generally C-shaped cross section defined by a vertical web 92, an upper horizontal flange 93 extending from an upper longitudinal edge of the web 92, and a lower horizontal flange 94 extending from a lower longitudinal edge of the web 92. The upper and lower flanges 93 and 94 are preferably formed integrally with the web 92 as shown, although such is not required. The upper and lower flanges 93 and 94 of the first side rail section 91 have respective longitudinally extending edges 95 and 96. Although shown as having a C-shaped cross section, it will be appreciated that the first side rail section 91 may be formed having any desired open channel cross sectional shape.

Similarly, the second side rail section 101 is a generally straight, elongated member having a generally C-shaped cross section defined by a vertical web 102, an upper horizontal flange 103 extending from an upper longitudinal edge of the web 102, and a lower horizontal flange 104 extending from a lower longitudinal edge of the web 102. The upper and lower flanges 103 and 104 are preferably formed integrally with the web 102 as shown, although such is not required. The upper and lower flanges 103 and 104 of the second side rail section 101 have respective longitudinally extending edges 105 and 106. Although shown as having a C-shaped cross section, it will be appreciated that the second side rail section 101 may be formed having any desired open channel cross sectional shape.

In the illustrated embodiment, the web 92 has a constant height throughout the end portion of the first side rail section 91, although such is not necessary. Similarly, the web 102 has a constant height throughout the end portion of the second side rail section 101, although such is not necessary. The height of the web 92 and the web 102 are approximately equal at the ends thereof such that the leading edge of the first side rail section 91 may be moved into abutment with the trailing edge of the second side rail section 101. To assemble the splice joint 90, the abutting edges of the first and second side rail sections 91 and 101 are secured together by any conventional means, such as by a butt weld 107. The butt weld 107 extends throughout the abutting edges of the upper flanges 93 and 103, the webs 92 and 102, and the lower flanges 94 and 104. The butt weld 107 may be continuous throughout this extent as illustrated, or may be formed in discrete areas. In this embodiment, the butt weld 107 may, if desired, extend completely to either the longitudinally extending edges 95 and 105 of the upper flanges 93 and 103, respectively, or the longitudinally extending edges 96 and 106 of the lower flanges 94 and 104, respectively.

To prevent or minimize the stress risers that would otherwise be present at the longitudinally extending edges 95, 96, 105, and 106, the splice joint 90 includes a support bracket, indicated generally at 110. The support bracket 110 is a generally C-shaped member defined by a vertical web 111, an upper horizontal flange 112 extending from an upper longitudinal edge of the web 111, and a lower horizontal flange 113 extending from a lower longitudinal edge of the web 111. The upper flange 111 further includes a curved lip section 114 that extends from the upper flange 112 around the longitudinally extending edges 95 and 105 and across portions of the upper surfaces of the upper flanges 93 and 103. Similarly, the lower flange 113 further includes a curved lip section 115 that extends from the lower flange 113 around the longitudinally extending edges 96 and 106 and across portions of the lower surfaces of the lower flanges 94 and 104. The curved lip sections 114 and 115 are preferably formed integrally with the upper and lower flanges 112 and 113 as shown, although such is not required. The longitudinal ends of the web portion 111 of the support bracket 110 terminate in vertically extending edges 116 and 117.

The support bracket 110 is disposed within the first and second side rail members 91 and 101 at the junction thereof such that the upper flange 112 of the support bracket 110 contacts portions of the lower surface of both the upper flange 93 of the first side rail member 91 and the upper flange 103 of the second side rail member 101. Similarly, the web 111 of the support bracket 110 contacts portions of the inner surface of both the web 92 of the first side rail member 91 and the web 102 of the second side rail member 101. Also, the lower flange 113 of the support bracket 110 contacts portions of the upper surface of both the lower flange 94 of the first side rail member 91 and the lower flange 104 of the second side rail member 101. As further shown therein, the upper lip section 114 of the support bracket 110 extends about portions of the longitudinally extending edges 95 and 105 and the upper surfaces of both the upper flange 93 of the first side rail member 91 and the upper flange 103 of the second side rail member 101. Similarly, the lower lip section 115 of the support bracket 110 extends about portions of the longitudinally extending edges 96 and 106 and the lower surfaces of both the lower flange 94 of the first side rail member 91 and the lower flange 104 of the second side rail member 101.

A second weld 118 is provided between the edge of the upper lip section 114 of the support bracket 110 and portions of the upper surface of the upper flange 93 of the first side rail section 91 and of the upper flange 103 of the second side rail section 101. Similarly, a third weld (not shown) is provided between the edge of the lower lip section 115 of the support bracket 110 and portions of the lower surface of the lower flange 94 of the first side rail section 91 and of the lower flange 104 of the second side rail section 101. A fourth weld 119 is provided between the leading edge of the support bracket 110 and the upper surface of the lower flange 104, the inner surface of the web section 102, and the lower surface of the upper flange 103 of the second side rail member 101. Similarly, a fifth weld (not shown) is provided between the trailing edge of the support bracket 110 and the upper surface of the lower flange 94, the inner surface of the web section 92, and the lower surface of the upper flange 93 of the first side rail member 91. The fourth and fifth welds 119 may be continuous as illustrated, or may be formed in discrete areas. However, it will be noted that on the upper flanges 93 and 103 and the lower flanges 94 and 104, the fourth and fifth welds 119 terminates prior to reaching the longitudinally extending edges 95 and 105 of the upper flanges 93 and 103, respectively, and the longitudinally extending edges 96 and 106 of the lower flanges 94 and 104, respectively. The support bracket 110 provides the same advantages as described above by preventing or minimizing the stress risers that would otherwise be present at the longitudinally extending edges 95, 96, 105, and 106 of the splice joint 90.

Figure 10:
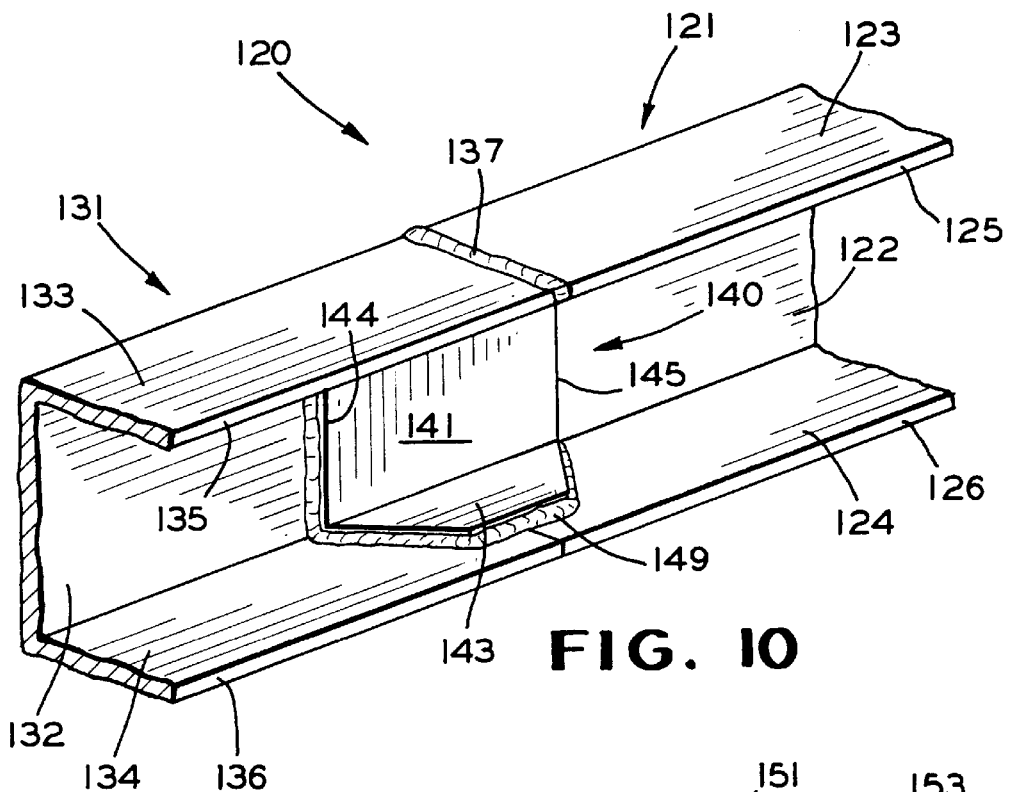
FIG. 10 is a perspective view of a fifth embodiment of a splice joint for permanently a pair of open channel side rail sections to provide a unitary side rail for a vehicular body and frame assembly in accordance with this invention.

Referring now to FIG. 10, there is illustrated a fifth embodiment of a splice joint, indicated generally at 120, in accordance with this invention for permanently joining the end portions of a pair of open channel side rail sections, indicated generally at 121 and 131, to provide a unitary side rail, such as for a vehicular body and frame assembly. The first side rail section 121 is a generally straight, elongated member having a generally C-shaped cross section defined by a vertical web 122, an upper horizontal flange 123 extending from an upper longitudinal edge of the web 122, and a lower horizontal flange 124 extending from a lower longitudinal edge of the web 122. The upper and lower flanges 123 and 124 are preferably formed integrally with the web 122 as shown, although such is not required. The upper and lower flanges 123 and 124 of the first side rail section 121 have respective longitudinally extending edges 125 and 126. Although shown as having a C-shaped cross section, it will be appreciated that the first side rail section 121 may be formed having any desired open channel cross sectional shape.

Similarly, the second side rail section 131 is a generally straight, elongated member having a generally C-shaped cross section defined by a vertical web 132, an upper horizontal flange 133 extending from an upper longitudinal edge of the web 132, and a lower horizontal flange 134 extending from a lower longitudinal edge of the web 132. The upper and lower flanges 133 and 134 are preferably formed integrally with the web 132 as shown, although such is not required. The upper and lower flanges 133 and 134 of the second side rail section 131 have respective longitudinally extending edges 135 and 136. Although shown as having a C-shaped cross section, it will be appreciated that the second side rail section 131 may be formed having any desired open channel cross sectional shape.

In the illustrated embodiment, the web 122 has a constant height throughout the and portion of the first side rail section 121, although such is not necessary. Similarly, the web 132 has a constant height throughout the end portion of the second side rail section 131, although such is not necessary. The height of the web 122 and the web 132 are approximately equal at the ends thereof such that the leading edge of the first side rail section 121 may be moved into abutment with the trailing edge of the second side rail section 131. To assemble the splice joint 120, the abutting edges of the first and second side rail sections 121 and 131 are secured together by any conventional means, such as by a butt weld 137. The butt weld 137 extends throughout the abutting edges of the upper flanges 123 and 133, the webs 122 and 132, and the lower flanges 124 and 134. The butt weld 137 may be continuous throughout this extent as illustrated, or may be formed in discrete areas. In this embodiment, the butt weld 137 may, if desired, extend completely to either the longitudinally extending edges 125 and 135 of the upper flanges 123 and 133, respectively, or the longitudinally extending edges 126 and 136 of the lower flanges 124 and 134, respectively.

To prevent or minimize the stress risers that would otherwise be present at the longitudinally extending edges 125, 126, 135, and 136, the splice joint 120 includes a support bracket, indicated generally at 140. The support bracket 140 is a generally C-shaped member defined by a vertical web 141, an upper horizontal flange (not shown) extending from an upper longitudinal edge of the web 141, and a lower horizontal flange 143 extending from a lower longitudinal edge of the web 141. The longitudinal ends of the web portion 141 of the support bracket 140 terminate in vertically extending edges 144 and 145. The support bracket 140 is disposed within the first and second side rail members 121 and 131 at the junction thereof such that the upper flange of the support bracket 140 contacts portions of the lower surface of both the upper flange 123 of the first side rail member 121 and the upper flange 133 of the second side rail member 131. Similarly, the web 141 of the support bracket 140 contacts portions of the inner surface of both the web 122 of the first side rail member 121 and the web 132 of the second side rail member 131. Also, the lower flange 143 of the support bracket 140 contacts portions of the upper surface of both the lower flange 124 of the first side rail member 121 and the lower flange 134 of the second side rail member 131.

A second weld 148 is provided between the leading edge of the support bracket 140 and the upper surface of the lower flange 134, the inner surface of the web section 132, and the lower surface of the upper flange 133 of the second side rail member 131. Similarly, a third weld (not shown) is provided between the trailing edge of the support bracket 140 and the upper surface of the lower flange 124, the inner surface of the web section 122, and the lower surface of the upper flange 123 of the first side rail member 121. The second and third welds 148 may be continuous as illustrated, or may be formed in discrete areas. If desired, the second and third welds 148 may be co-extensive, extending along both the upper and lower longitudinal edges of the support bracket 140, such as shown at 149. The support bracket 140 provides the same advantages as described above by preventing or minimizing the stress risers that would otherwise be present at the longitudinally extending edges 95, 96, 105, and 106 of the splice joint 90.

Figure 11:
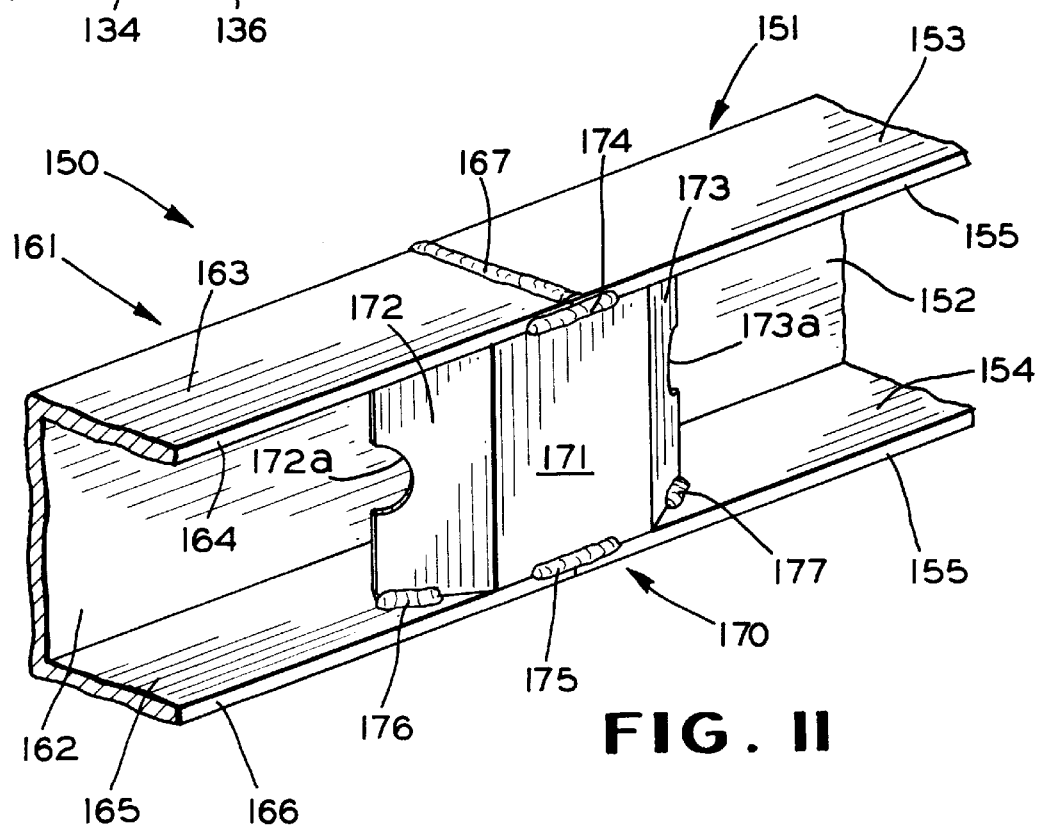
FIG. 11 is a perspective view of a sixth embodiment of a splice joint for permanently a pair of open channel side rail sections to provide a unitary side rail for a vehicular body and frame assembly in accordance with this invention.

Referring now to FIG. 11, there is illustrated a sixth embodiment of a splice joint, indicated generally at 150, in accordance with this invention for permanently joining the end portions of a pair of open channel side rail sections, indicated generally at 151 and 161, to provide a unitary side rail, such as for a vehicular body and frame assembly. The first side rail section 151 is a generally straight, elongated member having a generally C-shaped cross section defined by a vertical web 152, an upper horizontal flange 153 extending from an upper longitudinal edge of the web 152, and a lower horizontal flange 154 extending from a lower longitudinal edge of the web 152. The upper and lower flanges 153 and 154 are preferably formed integrally with the web 152 as shown, although such is not required. The upper and lower flanges 153 and 154 of the first side rail section 151 have respective longitudinally extending edges 155 and 156. Although shown as having a C-shaped cross section, it will be appreciated that the first side rail section 151 may be formed having any desired open channel cross sectional shape.

Similarly, the second side rail section 161 is a generally straight, elongated member having a generally C-shaped cross section defined by a vertical web 162, an upper horizontal flange 163 extending from an upper longitudinal edge of the web 162, and a lower horizontal flange 164 extending from a lower longitudinal edge of the web 162. The upper and lower flanges 163 and 164 are preferably formed integrally with the web 162 as shown, although such is not required. The upper and lower flanges 163 and 164 of the second side rail section 161 have respective longitudinally extending edges 165 and 166. Although shown as having a C-shaped cross section, it will be appreciated that the second side rail section 161 may be formed having any desired open channel cross sectional shape.

In the illustrated embodiment, the web 152 has a constant height throughout the end portion of the first side rail section 151, although such is not necessary. Similarly, the web 162 has a constant height throughout the end portion of the second side rail section 161, although such is not necessary. The height of the web 152 and the web 162 are approximately equal at the ends thereof such that the leading edge of the first side rail section 151 may be moved into abutment with the trailing edge of the second side rail section 161. To assemble the splice joint 150, the abutting edges of the first and second side rail sections 151 and 161 are secured together by any conventional means, such as by a butt weld 167. The butt weld 167 extends throughout the abutting edges of the upper flanges 153 and 163, the webs 152 and 162, and the lower flanges 154 and 164. The butt weld 167 may be continuous throughout this extent as illustrated, or may be formed in discrete areas. In this embodiment, the butt weld 167 may, if desired, extend completely to either the longitudinally extending edges 155 and 165 of the upper flanges 153 and 163, respectively, or the longitudinally extending edges 156 and 166 of the lower flanges 154 and 164, respectively.

To prevent or minimize the stress risers that would otherwise be present at the longitudinally extending edges 155, 156, 165, and 166, the splice joint 150 includes a support bracket, indicated generally at 170. The support bracket 170 has a vertical web 171 and a pair of end portions 172 and 173. The web 171 is aligned with the longitudinally extending edges 155, 156, 165, and 166 and is secured thereto by any conventional means, such as by second and third welds 174 and 175. The end portions 172 and 173 are angled inwardly from the web 171 so as to extend away from the longitudinally extending edges 155, 156, 165, and 166. A fourth weld 176 is provided for securing a portion of the lower edge of the leading end portion 172 to a portion of the upper surface of the lower flange 165 of the second side rail section 161. A fifth weld 177 is provided for securing a portion of the lower edge of the trailing end portion 173 to a portion of the upper surface of the lower flange 155 of the first side rail portion 151. Similar welds (not shown) are provided for securing portions of the upper edges of the end portions 172 and 173 respectively to portions of the lower surfaces of the upper flanges 153 and 163 of the first and second side rail sections 151 and 161. If desired, the end portions 172 and 173 of the support bracket 170 may terminate in vertically extending edges having respective cut-outs 172a and 173a formed therein for the same purpose as described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A unitary side rail for use in a vehicular body and frame assembly comprising:

a first side rail section including an end portion having a web; and a second side rail section including an end portion having a web, said second side rail section web including a main portion and an offset portion extending from said main portion to an end of said second side rail section, said first side rail section web abutting said main portion of said second side rail section web, said first side rail section web being spaced apart from said offset portion and said end of said second side rail section web, said end portions of said first and second side rail sections being secured together at a joint to form the unitary side rail for use in a vehicle body and frame assembly.

2. The unitary side rail defined in claim 1 wherein said offset portion of said second side rail section web includes a curved portion and a straight portion extending parallel, but offset from said main portion of said second side rail section web.

3. The unitary side rail defined in claim 1 wherein said end portion of said first side rail section further includes first and second flanges extending from said web.

4. The unitary side rail defined in claim 1 wherein said end portion of said second side rail section further includes first and second flanges extending from said web.

5. The unitary side rail defined in claim 1 wherein said end portion of said first side rail section further includes first and second flanges extending from said web, and wherein said end portion of said second side rail section further includes first and second flanges extending from said web.

6. The unitary side rail defined in claim 5 wherein said first flange of said first side rail section abuts said first flange of said second side rail section.

7. The unitary side rail defined in claim 5 wherein said second flange of said first side rail section abuts said second flange of said second side rail section.

8. The unitary side rail defined in claim 5 wherein said first flange of said first side rail section abuts said first flange of said second side rail section, and wherein said second flange of said first side rail section abuts said second flange of said second side rail section.

9. The unitary side rail defined in claim 5 wherein said end portion of said second side rail section extends between said first and second flanges of said end portion of said first side rail section.

10. The unitary side rail defined in claim 1 wherein said end portion of said second side rail section further includes first and second flanges extending from said web and terminating in respective edges, said edges having offset portions formed therein.

11. The unitary side rail defined in claim 10 wherein each of said offset portions of said first and second flanges of said second side rail section includes a curved portion and a straight portion extending parallel, but offset from, said edge.

12. The unitary side rail defined in claim 1 wherein said end of said second side rail section terminates in an edge having a cut-out formed therein.

* * * * *